S. A. REDDING.
CLAMPING DEVICE FOR TROLLEY AND OTHER PURPOSES.
APPLICATION FILED JUNE 19, 1916.
1,222,132.
Patented Apr. 10, 1917.
2 SHEETS—SHEET 2.
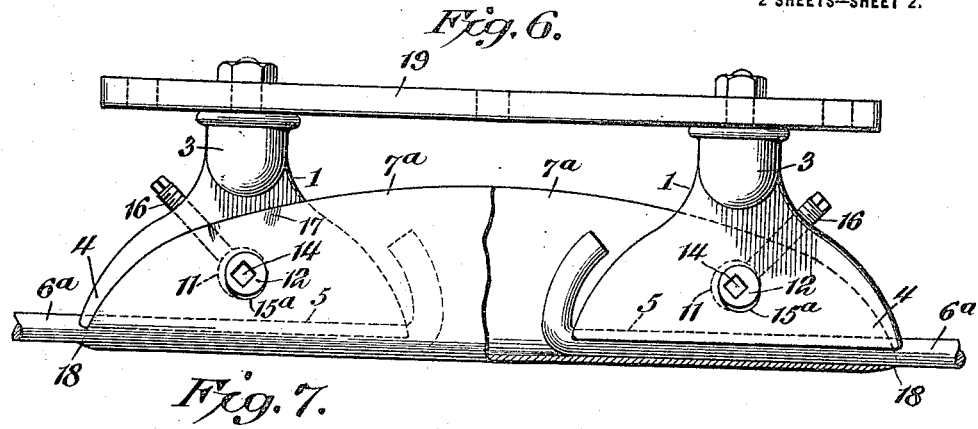
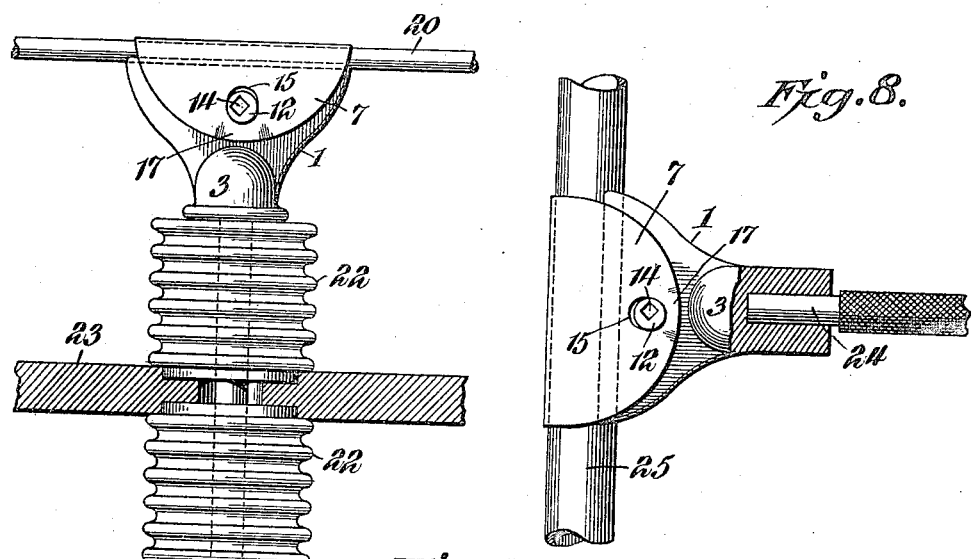
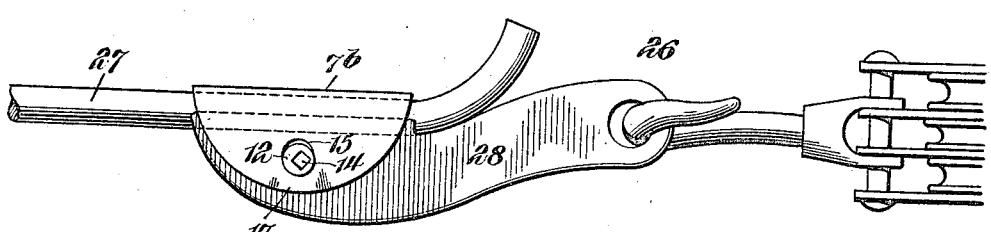
WITNESSES
Samuel A. Redding, INVENTOR,
BY
ATTORNEY

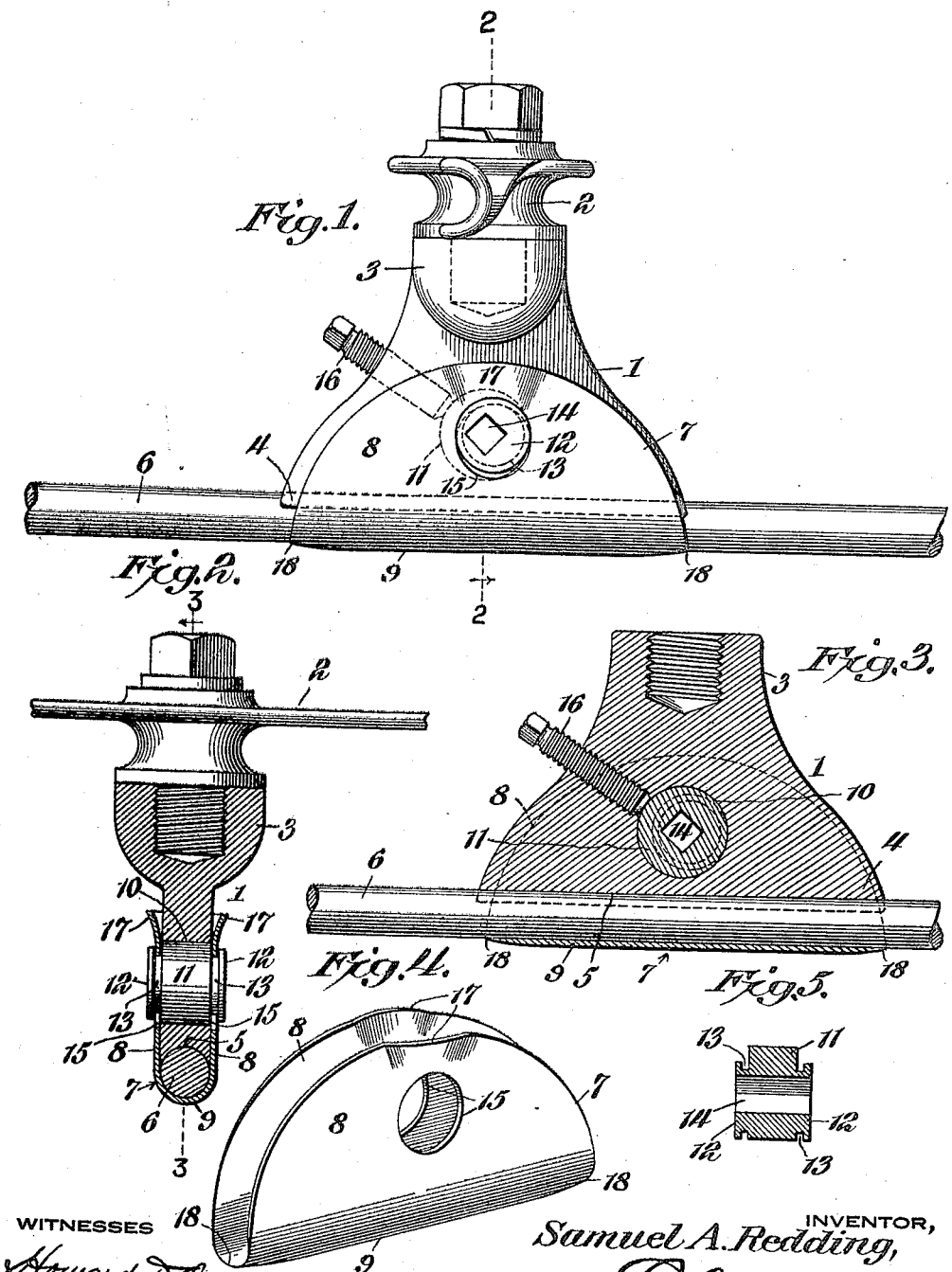

UNITED STATES PATENT OFFICE.

SAMUEL ARTHUR REDDING, OF ATLANTA, GEORGIA.

CLAMPING DEVICE FOR TROLLEY AND OTHER PURPOSES.

1,222,132.  Specification of Letters Patent.  Patented Apr. 10, 1917.

Application filed June 19, 1916. Serial No. 104,610.

*To all whom it may concern:*

Be it known that I, SAMUEL A. REDDING, a citizen of the United States, residing at Atlanta, in the county of Fulton and State of Georgia, have invented a new and useful Clamping Device for Trolley and other Purposes, of which the following is a specification.

This invention has reference to clamping devices for trolley and other purposes, and its object is to provide a clamping device particularly useful for the purpose of connecting trolley wires to hangers or for connecting trolley wires or other like structures to other devices, and, in fact, having an applicability wherever it is desired to firmly connect two parts or articles together.

The invention comprises a backing or body member, an eccentric member seated therein, and another clamp member shaped to embrace the body member and be engaged by the eccentric in a manner to grip the article to be clamped between the two members when the eccentric is in one position and to release the article to be clamped when the eccentric is in another position. The second-named clamp member, which may be termed the clamping member, is preferably made of tempered sheet metal, such as tempered steel or tempered bronze, folded upon itself in such a manner as to provide two opposed sides to engage correspondingly opposite sides of the body member, with the eccentric traversing the body member and the walls of the opposed sides of the clamping member. Considering the clamping member as formed of sheet metal, the eccentric is provided at the ends with circular channels adapted to receive the walls of the clamping member where traversed by the eccentric.

In one form of the invention the eccentric is in the form of a cylindrical block with a socket or passage for the application of a tool, whereby the eccentric may be turned in the body of the trolley clamp and in such case the circular grooves designed to receive portions of the walls of the clamping member are arranged eccentrically to the longitudinal axis of the block. The result is that when the clamp body and the clamping member are placed in embracing relation to a trolley wire, for instance, and the eccentric block is so turned that the grooves are toward the trolley wire or the portion of the clamp designed to receive the trolley wire, the clamping member and body are separated sufficiently to easily admit the trolley wire between them. When the eccentric block is turned from the seated position the two parts of the clamp are drawn together, thereby firmly clamping the trolley wire between them, and this position may be maintained by a set screw or other holding device as a precautionary measure.

Because the clamping member is made of sheet metal, the side walls are very easily sprung apart to apply it about a trolley wire, and then the walls readily spring over the ends of an already positioned eccentric block, and where the normal tendency of these walls is toward each other the springing together of the walls after having been forced apart causes them to lodge on the eccentric block in the grooves, where they will remain in such engagement while the eccentric block is being turned to force the two parts of the clamp together.

In addition to the use of the invention for connecting a trolley wire to hangers, it may be used as a connector for adjacent ends of trolley wires, as a bus-bar support, as a ground clamp, as a come-along clamp, or for various other purposes, especially in connection with trolley roads.

The invention will be best understood from a consideration of the following detailed description, taken in connection with the accompanying drawings forming part of this specification, with the further understanding that while the drawings show a practical form of the invention, the latter is not confined to any strict conformity with the showing of the drawings, but may be changed and modified so long as such changes and modifications come within the scope of the appended claims.

In the drawings:—

Figure 1 is an elevation of a trolley wire hanger with the invention applied.

Fig. 2 is a section on the line 2—2 of Fig. 1 with some parts in elevation.

Fig. 3 is a section on the line 3—3 of Fig. 2, but limited to the trolley clamp body and clamping member and trolley wire.

Fig. 4 is a perspective view of the clamping member.

Fig. 5 is a longitudinal section of the eccentric block.

Fig. 6 is a view similar to Fig. 1 with a portion of the clamping member in section, but showing the application of the device as a means for joining the adjacent ends of two trolley wires or parts thereof.

Fig. 7 is an elevation with some parts in section showing the application of the invention to a bus-bar support.

Fig. 8 is an elevation with some parts in section showing the application of the invention as a grounding clamp.

Fig. 9 is a side elevation of the invention as applied to a come-along.

Referring to the drawings, and especially to Figs. 1 to 5, there is shown a trolley clamp body 1 with a supporting hanger 2, which latter does not in itself enter into the present invention and may be of any suitable or approved form, and hence needs no special description. The trolley clamp body is provided with a socket portion 3 for receiving the hanger 2, while on the portion of the clamp body remote from the socket 3 such body is flared and thinned to provide an extended backing portion 4 suitably longitudinally grooved, as indicated at 5, to receive and seat a trolley wire 6.

There is also provided a clamping member 7 preferably of sheet metal of appropriate size, bent intermediately upon itself to form two side walls 8 in facing relation, with the intermediate bend, indicated at 9, appropriately rounded to conform to the shape of the trolley wire 6.

As it is usual to flare the clamp body from the socket 3 toward the wire-engaging portion 4, the clamping member 8 is of rounded contour, although any special shape is not at all obligatory. About midway between the socket 3 and the grooved edge 5 of the body 1, such body, which is comparatively thin, is provided with a passage 10 extending completely through it, such passage being of cylindrical form. Adapted to such passage is a block 11 also of cylindrical form, and in the main of a length to extend from one side wall of the body member 1 to the other side wall thereof, where such body member is pierced by the passage 10. On each end face of the block 11 is a projection or lug 12, which may also be of circular contour, and immediately adjacent to the corresponding end wall of the main portion of the block 11 each projection or lug 12 is formed with a circular groove 13 extending completely about it, but both lugs and their circular or peripheral grooves 13 are arranged eccentrically to the axis of the block 11. However, all portions of each lug 12 are within the confines of the peripheral portion of the body of the block 1. The block 11 is provided with a passage 14 which may extend entirely through it and may be located in the axis of said block, although this passage being intended for and shaped to receive a turning tool may be located in the block where found most convenient. In the particular showing of the drawings the passage 14 is of square cross-section, and is located in the longitudinal axis of the block 11, but any particular shape or location of the passage is not obligatory. Nor is the invention limited with respect to the block 11 to the use of a passage for the turning tool, since the block may be constructed in any suitable manner whereby rotatable movement may be imparted to it in any way.

The side walls 8 of the clamping member 7 are provided with alined passages 15, each of a size to permit movement of a corresponding lug or projection 12 through it to an extent to allow the corresponding wall 8 immediately adjacent to the passage 15 to lodge in the respective groove 13, so that the passage 15 becomes to an extent eccentric to the lug or projection 12 and can not escape therefrom except the passage 15 be alined with the longitudinal axes of the lugs or projections 12.

The parts are so proportioned with respect to each other that when the longitudinal axis of generation of the grooves 13 is in close relation to the wire receiving groove 5, the space between such groove and the bend 9 of the clamping member 8 is greater than the diameter of the trolley wire 6 if the latter be the article to be clamped, and this distance is sufficiently greater than the diameter of the trolley wire to permit the wire to be lodged in the groove 5 and then permit the application of the clamping member 7 to the wire with the passages 15 then so related to the lugs or projections 12 as to move thereover and lodge in the grooves 13. With the parts so positioned and the wire properly lodged on and supported by the clamping member 7, it being assumed that the trolley clamp body is pendent, a suitable tool is introduced into the passage 14 and the block 11 is turned in a manner to cause the eccentric lugs or projections 12 to approach the socket 3, this resulting in the lifting of the clamping member 7 toward the body member 1 and a corresponding clamping of the trolley wire to the body member 1 by the clamping member 7. This is due to the eccentric relation of the lugs or projections 12 and their grooves 13 to the axis of turning of the block 11. By the use of a suitably long tool and by having a proper relation of eccentricity of the lugs 12 and grooves 13 to the axis of rotation of the block 11, a very strong clamping force may be exerted upon the wire 6 to hold it against the body member 1. There is but slight chance of the body member 1 subsequently loosening accidentally, but in order to avoid even such a slight chance, a set screw 16 is tapped into the body member 1 to intersect the passage 10 and engage the block 11 to hold it against turning movements. When it is desired to purposely unclamp the trolley wire, the set screw 16 is easily loosened and the clamping block 11 may be turned with but little effort to a position removing the clamping member 7 from clamping relation to the wire 6.

Because of the projection of the lugs 12 beyond the side faces of the body member 1, the free ends of the sides 8 at intermediate points in line with the passages 15 have struck-out portions 17 with sufficient flare to readily pass over the lugs or projections 12, thereby spreading the side walls 8 which are sufficiently elastic for the purpose, and which side walls will snap back into place when the passages 15 coincide with the lugs 12, wherefore no particular care need be taken to insure the proper placing of the clamping member 7 on to the clamp body 1.

When the device is used in connection with a trolley wire, the end portions of the curve or channel part 9 of the clamping member 7 are thinned, as shown at 8, so as to provide a comparative feather edge to an approaching or leaving trolley wheel, wherefore a trolley wheel will underride the trolley wire and clamping member 7 with no noticeable effect in spite of the presence of the clamping member 7.

By making the clamping member 7 of some such metal as steel or bronze, each of which is capable of being made very hard and wear resisting, the clamping member becomes practically indestructible and will last for long periods of time under the conditions of use, and will outwear many trolley ears of the character where the holding means for the wire is beaten or bent about the latter. Since the clamping member does not become worn to any material extent, there is no danger of loosening or falling of the trolley wires from the holding devices as often occurs with the devices commonly in use.

Where it is desirable to connect the adjacent ends of two trolley wires or to join the adjacent ends of a broken trolley wire, the structure of Fig. 6 may be employed. This is in the main the same as the structure of Fig. 1 and associated figures, except that there is a clamping member 7ª sufficiently long to extend between two adjacent body members 1 connected by a strain plate 19, but which latter in itself forms no part of the present invention. In Fig. 6 are shown two adjacent ends 6ª of two trolley wires or the adjacent broken ends of a trolley wire seated in the bottom grooves 5 of the adjacent body members 1, while the clamping member 7ª is like the clamping member 7, except considerably longer, and is provided with passages 15ª to receive the projections 12 of the blocks 11 of both members 1, so that both ends 6ª of the trolley wire or wires are clamped tightly to the body members 1 against any chance of pulling out, and the under or trolley wheel surface of the clamping member 7ª completely spans any break in the continuity of the trolley wire.

In Fig. 7 there is shown a member 20 which may be taken as representing a bus-bar, and this member is shown as clamped by a clamping member 7 to a body member 1 mounted on insulators 22 carried by a support 23 in the usual manner. Since in the case of a bus-bar as shown in Fig. 7 the thinned edges 18 of the clamping member 7 are not needed, they have been omitted from the showing of Fig. 7.

In Fig. 8 there is illustrated a grounding clamp comprising a body member 1 and a clamping member 7, all as in Fig. 1, but instead of a hanger 2 a conductor 24 is made fast to the socket end of the body member 1, while the clamping member 7 is shown as applied about a pipe 25 which may be representative of a water pipe or any other suitable metallic member furnishing a good ground.

It is evident that the clamp as shown in Fig. 8 is adaptable for use wherever it is desirable to provide particularly reliable electrical connections.

It is often desirable to string wires, and it is frequently necessary to string trolley wires. For this purpose it is customary to use a structure commonly known as a come-along, and which is generally represented at 26 in Fig. 9. Such a come-along has at one end a clamping or gripping member for the wire. In Fig. 9 the wire, whatever be its character, is indicated at 27, and the come-along has a member 28 corresponding to the body member 1 of the structures of the previous figures. In connection with the body clamp member 28 is a clamping member 7ᵇ which may correspond to the clamping member 7 of Fig. 1 and associated figures. The action of the clamping member 7ᵇ and the clamp body 28 of Fig. 9, is the same as has already been described with reference to the other figures and no further description is necessary.

It is not necessary in all the various forms of the invention shown in the drawings that the clamping member 7 or its equivalent be made of some specially tempered metal, because in some cases it is not subjected to wear as in other cases, but these are features which need not be especially mentioned, as they would naturally suggest themselves to one skilled in the art.

What is claimed is:—

1. A clamp for trolley wires and other purposes, comprising a body member constituting one member of the clamp, a clamping member constituting the other member of the clamp and adapted to coöperate with the body member and a rotatable connecting member mounted on one part of the clamp and having eccentric portions engaging the other member of the clamp, whereby on turning the third member in either direction about its axis of rotation the clamping member may be drawn into clamping relation to the body member.

2. A clamp for trolley wires and other purposes, comprising a body member, a clamping member having opposed sides adapted to embrace the body member, and a rotatable block seated in the body member and having end projections extending through the sides of the clamping member, said projections being provided with eccentric portions engaging the side walls of the clamping member to draw the latter toward the body member into clamping engagement with an object lodged therebetween.

3. A clamping device for trolley wires and other purposes, comprising a body member and a clamping member of sheet form having spaced opposed side walls adapted to embrace the body member, and an eccentric device carried by the body member and engaging the side walls of the clamping member to move the latter into and out of clamping relation to the body member.

4. A clamping device for trolley wires and other purposes, comprising a body member and a clamping member of sheet form having spaced opposed side walls adapted to embrace the body member, and an eccentric device carried by the body member and engaging the side walls of the clamping member to move the latter into and out of clamping relation to the body member, said clamping member having eccentric seating portions for the side walls of the clamping member.

5. A clamping device for trolley wires and other purposes, comprising a body member adapted to engage the device to be clamped, a clamping member of sheet form bent upon itself to form two opposed side walls in embracing relation to the body member and adapted to clamp the article against the body member, the side walls of the clamping member and the body member having passages therethrough, and a rotatable block seated in the body member and provided with projections extending through the side walls of the clamping member and having grooves therein to receive said side walls where passing through them with the grooves in eccentric relation to the axis of rotation of the block.

6. A clamp for trolley wires and other purposes, comprising a body member, a clamping member of sheet metal bent intermediately upon itself to form opposed spaced side walls adapted to embrace the body member, and a rotatable block lodged in the body member and provided with projecting ends extending through the side walls of the clamping member with said projections engaging and seating said side walls and the seating portions of the projections being in eccentric relation to the axis of rotation of the block.

7. A clamp for trolley wires and other purposes, comprising a body member, a clamping member of sheet metal bent intermediately upon itself to form opposed spaced side walls adapted to embrace the body member, and a rotatable block lodged in the body member and provided with projecting ends extending through the side walls of the clamping member with said projections engaging and seating said side walls, and the seated portions of the projections being in eccentric relation to the axis of rotation of the block, the body member being also provided with a set screw for fixing the rotatable block in adjusted positions.

8. A clamping device for trolley wires, comprising a body member, a sheet metal clamping member between which and the body member a trolley wire is lodged, and a rotatable block mounted on the body member and provided with eccentric projections having peripheral grooves therein adapted to seat corresponding portions of the clamping member and arranged in eccentric relation to the axis of rotation of the block.

9. A clamp for trolley wires, comprising a body member, a sheet metal clamping member folded upon itself with side walls in spaced relation to form a channel for receiving the trolley wire to clamp it against the body member, the side walls being in embracing relation to the body member, and a rotatable block lodged in the body member and provided with end projections extending through and seating the side walls of the clamping member where traversing them, the grooves and the end projections being in eccentric relation to the axis of rotation of the block.

10. A clamp for trolley wires, comprising a body member, a sheet metal clamping member folded upon itself with side walls in spaced relation to form a channel for receiving the trolley wire to clamp it against the body member, the side walls being in embracing relation to the body member, and a rotatable block lodged in the body member and provided with end projections extending through and seating the side walls of the clamping member where traversing them, the grooves and the end projections being in eccentric relation to the axis of rotation of the block, the side walls of the clamping member being elastic and having a normal tendency toward the clamping member and provided with struck-out portions corresponding to the line of application of the clamping member to the body member for engaging over the end projections of the rotatable block to expand the clamping member on application for finally snapping over the projections of the rotatable block.

11. A clamp for trolley wires, comprising a body member, a clamping member of sheet metal bent upon itself to provide a channel for engaging the trolley wire and clamping it against the body member, and side walls in embracing relation to the body member, the ends of the channel portion of the clamping member being thinned toward their extremities to there approach the trolley wire when applied, and an eccentric member carried by the body member and engaging the clamping member for forcing the clamping member into clamping relation to the trolley wire and the latter into clamped relation to the body member by rotative movements of the eccentric member.

In testimony, that I claim the foregoing as my own, I have hereto affixed my signature in the presence of two witnesses.

SAMUEL ARTHUR REDDING.

Witnesses:
JOHN H. SIGGERS,
MARIE L. LEWIS.

Copies of this patent may be obtained for five cents each, by addressing the "Commissioner of Patents, Washington, D. C."